United States Patent
Otsu et al.

(10) Patent No.: US 9,695,712 B2
(45) Date of Patent: Jul. 4, 2017

(54) ATTACHMENT BOSS AND FAN CASE

(71) Applicants: IHI Corporation, Koto-ku (JP); IHI AEROSPACE CO., LTD., Koto-ku (JP)

(72) Inventors: Osamu Otsu, Tokyo (JP); Yu Shigenari, Tokyo (JP); Takashi Harada, Tokyo (JP); Tsutomu Murakami, Tokyo (JP)

(73) Assignees: IHI Corporation, Koto-ku (JP); IHI AEROSPACE CO., LTD., Koto-ku (JP)

( * ) Notice: Subject to any disclaimer, the term of this patent is extended or adjusted under 35 U.S.C. 154(b) by 460 days.

(21) Appl. No.: 14/296,068

(22) Filed: Jun. 4, 2014

(65) Prior Publication Data

US 2014/0286769 A1    Sep. 25, 2014

Related U.S. Application Data

(63) Continuation of application No. PCT/JP2011/078239, filed on Dec. 7, 2011.

(51) Int. Cl.
*F01D 25/28* (2006.01)
*F02C 7/04* (2006.01)
(Continued)

(52) U.S. Cl.
CPC ............... *F01D 25/28* (2013.01); *F02C 7/00* (2013.01); *F02C 7/04* (2013.01); *F02C 7/32* (2013.01);
(Continued)

(58) Field of Classification Search
CPC .... F01D 25/28; F02C 7/04; F02C 7/32; F02C 7/00; F05D 2260/31; F05D 2300/614; F05D 2300/603; F16B 5/02; Y02T 50/672
See application file for complete search history.

(56) References Cited

U.S. PATENT DOCUMENTS 4,786,541 A * 11/1988 Nishimura ............ B29C 70/228
428/102
5,079,055 A    1/1992 Doyle
(Continued)

FOREIGN PATENT DOCUMENTS

CN    102016265 A    4/2011
EP    2 474 712 A2    7/2012
(Continued)

OTHER PUBLICATIONS

Combined Office Action and Search Report issued Jun. 3, 2015 in Chinese Patent Application No. 201180075302.X (with English translation and English translation of category of documents).
(Continued)

*Primary Examiner* — Igor Kershteyn
(74) *Attorney, Agent, or Firm* — Oblon, McClelland, Maier & Neustadt, L.L.P.

(57) ABSTRACT

A boss for attachment of an auxiliary device to a fan case of an engine includes a pedestal including a plurality of accumulated layers of reinforcement fibers and a matrix combining the reinforcement fibers together, the pedestal including a bottom face in a shape capable of being in close contact with an outer periphery of the fan case; and an embedded body embedded in the pedestal and including a combining structure combinable with the auxiliary device.

14 Claims, 4 Drawing Sheets

(51) Int. Cl.
*F02C 7/32* (2006.01)
*F02C 7/00* (2006.01)
*F16B 5/02* (2006.01)

(52) U.S. Cl.
CPC .... *F05D 2260/31* (2013.01); *F05D 2300/603* (2013.01); *F05D 2300/614* (2013.01); *F16B 5/02* (2013.01); *Y02T 50/672* (2013.01)

(56) References Cited

U.S. PATENT DOCUMENTS

| | | | |
|---|---|---|---|
| 5,845,872 A | | 12/1998 | Pridham et al. |
| 2007/0009712 A1 | | 1/2007 | Roth |
| 2008/0118683 A1 | | 5/2008 | Xie |
| 2009/0039208 A1 | | 2/2009 | Raeckers |
| 2011/0085897 A1 | | 4/2011 | Vauchel et al. |
| 2012/0177490 A1* | | 7/2012 | Lussier .................. F01D 25/28 415/213.1 |
| 2015/0275689 A1* | | 10/2015 | Lussier ................ F01D 21/045 415/200 |

FOREIGN PATENT DOCUMENTS

| | | |
|---|---|---|
| GB | 2 046 861 A | 11/1980 |
| JP | 63-130909 A | 6/1988 |
| JP | 06-126869 A | 5/1994 |
| JP | 2003-286866 A | 10/2003 |
| JP | 2007-504968 A | 3/2007 |
| JP | 2007-168397 A | 7/2007 |
| JP | 2008-133934 A | 6/2008 |
| JP | 2008-542119 A | 11/2008 |
| RU | 2 382 218 C1 | 2/2010 |
| RU | 2 398 122 C1 | 8/2010 |
| RU | 2 398 123 C1 | 8/2010 |

OTHER PUBLICATIONS

Extended European Search Report issued on Feb. 12, 2015 in Application No. 11877169.0.
Canadian Office Action issued May 11, 2015 in Patent Application No. 2,857,938.
Decision of Grant issued Sep. 16, 2015 in Russian Patent Application No. 2014127284/02(044121) (with English language translation).
International Search Report mailed Feb. 7, 2012 for PCT/JP2011/078239 filed on Dec. 7, 2011 with English Translation.
International Written Opinion mailed Feb. 7, 2012 for PCT/JP2011/078239 filed on Dec. 7, 2011.

\* cited by examiner

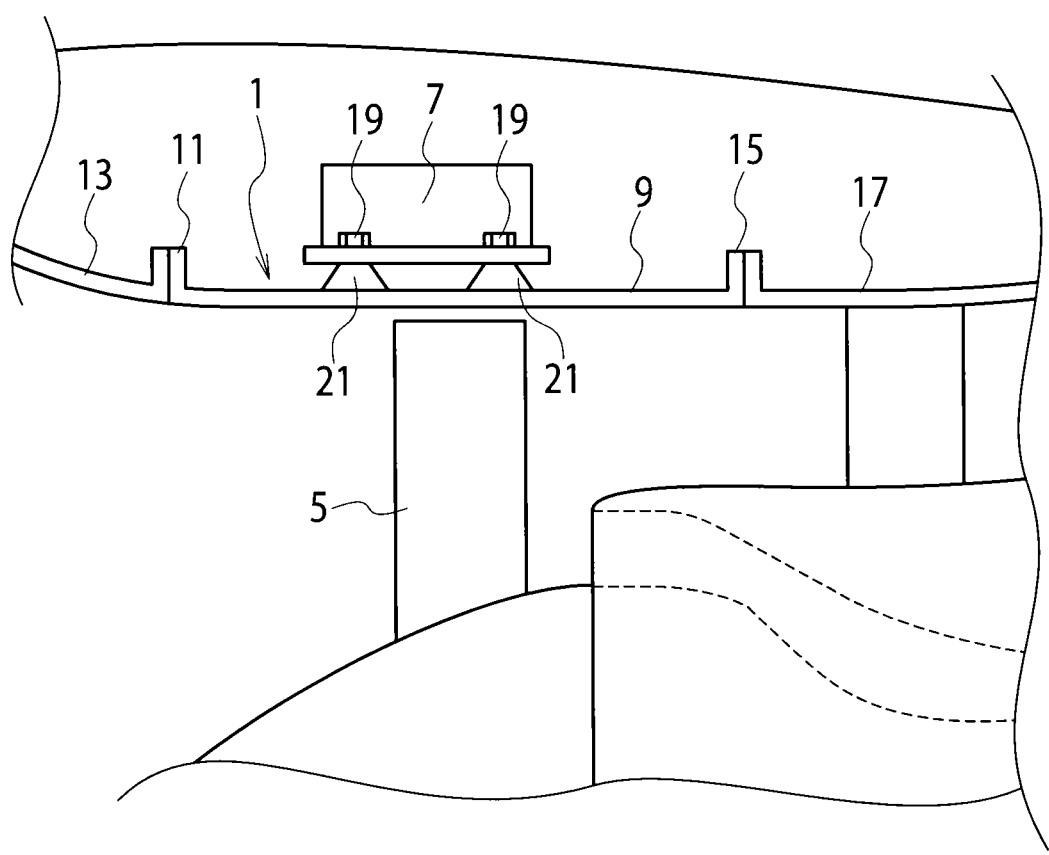

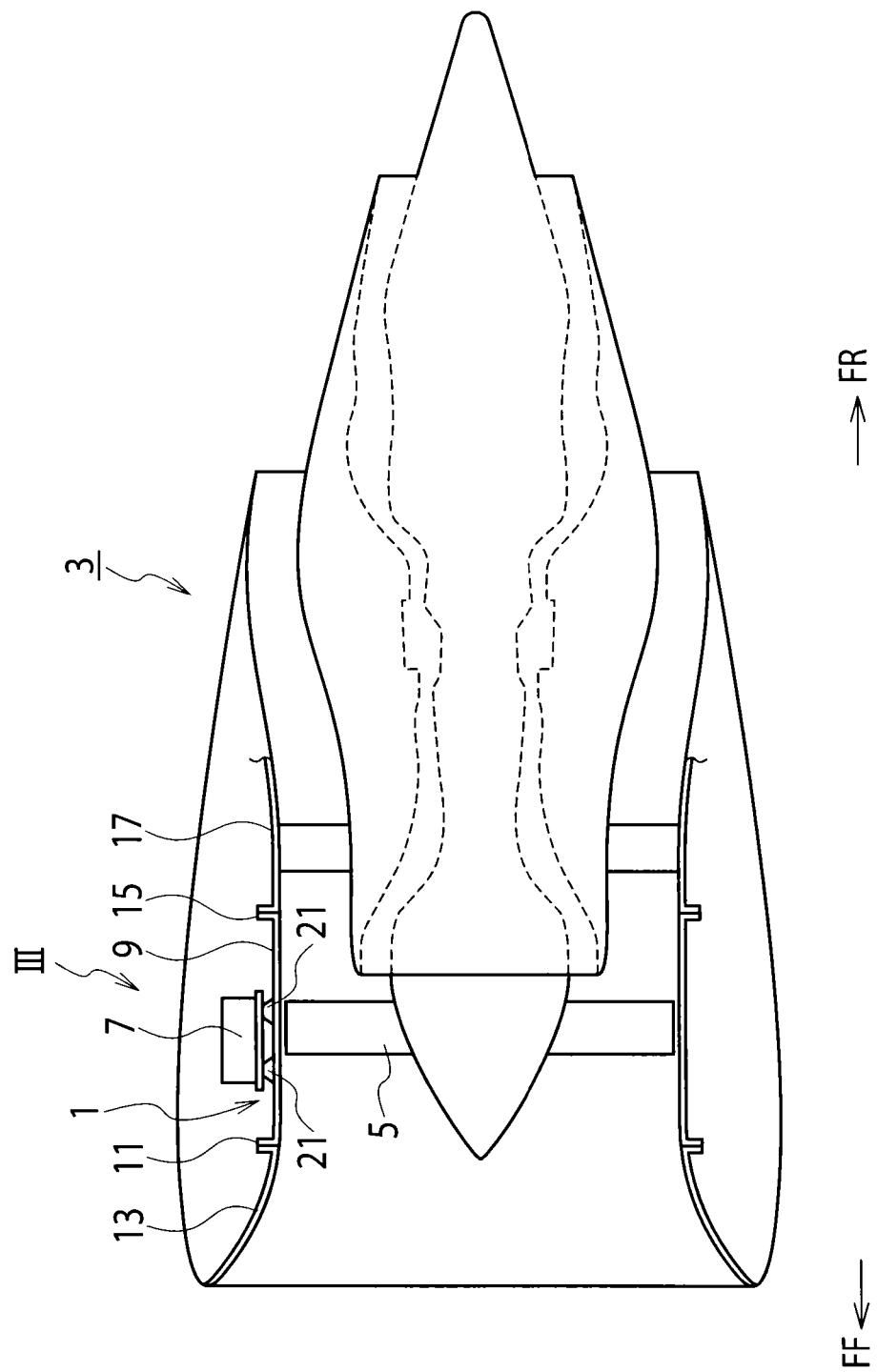

ATTACHMENT BOSS AND FAN CASE

CROSS-REFERENCE TO RELATED APPLICATIONS

This application is a Continuation Application of PCT International Application No. PCT/JP2011/078239 (filed Dec. 7, 2011), the entire contents of which are incorporated herein by reference.

BACKGROUND OF THE INVENTION

Field of the Invention

The present invention relates to an attachment boss preferably applicable to a member composed of a fiber reinforced composite material, such as a fan case of an aircraft engine, and a fan case therewith.

Description of the Related Art

An aircraft engine is comprised of a fan at its foremost stage for the purpose of introducing air, peripheries of which are surrounded by a fan case. In order to reduce weight and increase strength, fiber reinforced resin (FRP) is often applied to the fan case. As FRP representatively exemplified is carbon fiber reinforced resin (CFRP), while glass fiber reinforced resin (GFRP) and Kevlar fiber reinforced resin (KFRP) can be exemplified as well.

A member of FRP is typically produced by: winding reinforcement fibers around a proper mandrel; impregnating it with thermosetting resin; and curing it by heating. FRP, where the reinforcement fibers are continuous, has an extremely high strength but, where the fibers are discontinuous, seriously loses its high strength. This causes a problem when an auxiliary device is attached to a member of FRP.

US Patent Application Publication 2008/0118683 A1 discloses a structure of a composite material having an installation flange.

SUMMARY OF THE INVENTION

The present invention is intended to provide a boss for attachment, which enables secure fixation of an auxiliary device by a readily applicable method such as tightening by a bolt.

According to a first aspect of the present invention, a boss for attachment of an auxiliary device to a fan case of an engine is comprised of a pedestal including a plurality of accumulated layers of reinforcement fibers and a matrix combining the reinforcement fibers together, the pedestal comprising a bottom face in a shape capable of being in close contact with an outer periphery of the fan case; and an embedded body embedded in the pedestal and including a combining structure combinable with the auxiliary device.

According to a second aspect of the present invention, a fan case of an engine, to which an auxiliary device is attached, is comprised of a case main body of a fiber reinforced composite material; a boss joined to an outer periphery of the case main body; a pedestal including a plurality of accumulated layers of reinforcement fibers and a matrix combining the reinforcement fibers together, the pedestal comprising a bottom face in a shape capable of being in close contact with an outer periphery of the fan case; and an embedded body embedded in the pedestal and including a combining structure combinable with the auxiliary device.

BRIEF DESCRIPTION OF DRAWINGS

FIG. 3 is a partial elevational view of the fan case, which shows a state where an auxiliary device is attached thereto by means of the attachment boss.

FIG. 4 is an elevational view of the fan case, which shows a state where the auxiliary device is attached thereto by means of the attachment boss, where FIG. 3 is taken from an arrow III therein.

DETAILED DESCRIPTION OF THE EXEMPLARY EMBODIMENTS

Figure 1A:
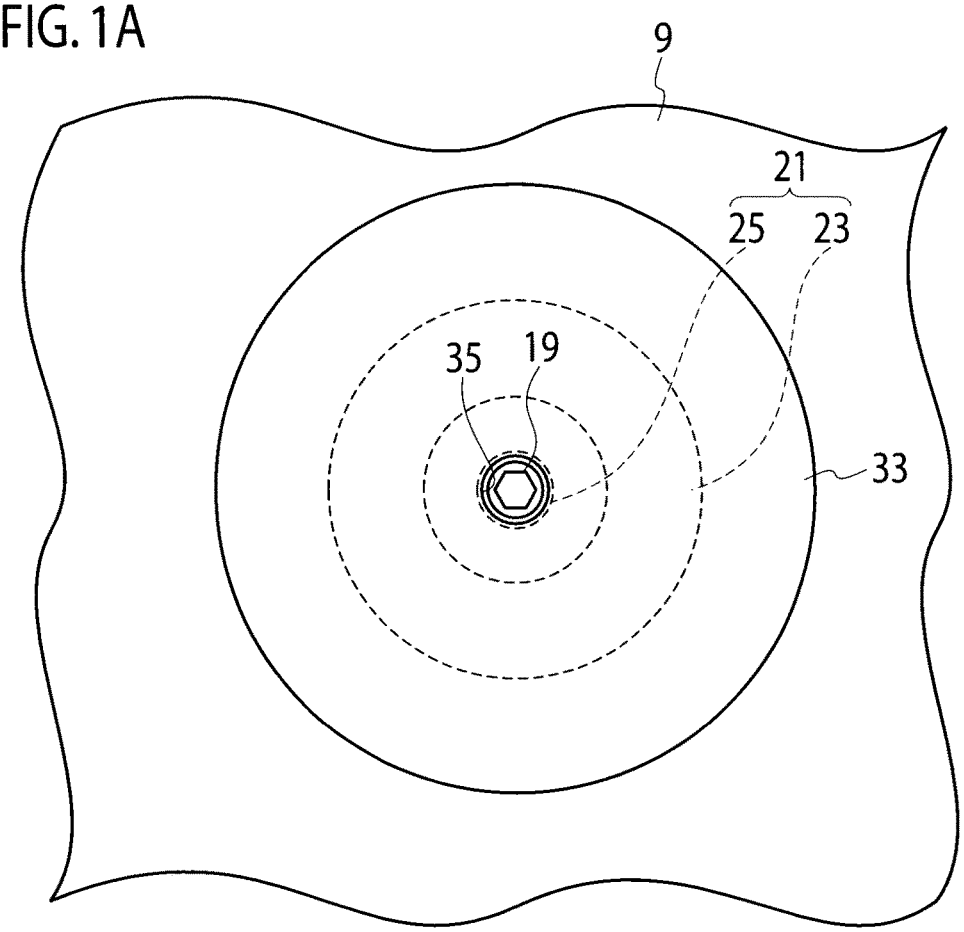
FIG. 1A is a plan view of an attachment boss and a part of a fan case in accordance with a first embodiment of the present invention.

Exemplary embodiments of the present invention will be described hereinafter with reference to the appended drawings.

In the appended drawings, FF means forward and FR means rearward but this distinction is not limiting for the invention.

The present embodiments of the present invention are applicable to a fan case of FRP in a jet engine of an aircraft, but may be also applicable to other various machines of FRP or any non-metallic material.

Referring mainly to FIG. 4, an engine 3 of an aircraft is comprised of a fan 5 at its foremost stage. In a nacelle covering most thereof, a part 1 surrounding the fan 5 is referred to as a fan case. The totality of the fan case 1 forms a nearly cylindrical shape and is of FRP such as CFRP for instance. The fan case 1 of FRP is produced by winding reinforcement fibers of carbon or such around a mandrel corresponding to a shape of the fan case 1, impregnating it with thermosetting resin, and curing it by heating. The thermosetting resin may be in advance made to permeate in the reinforcement fibers.

The fan case 1 is normally comprised of a main body 9 and flanges 11,15 projecting outward at both ends of the main body 9, and is, at the front flange 11, fixed to a front case and, at the rear flange 15, fixed to a rear case 17 respectively by bolts.

Referring mainly to FIG. 3, to an outer face of the main body 9 attached are one or more auxiliary devices 7 by means of a plurality of attachment bosses 21. To each auxiliary device, one or more attachment bosses are assigned.

Figure 1B:
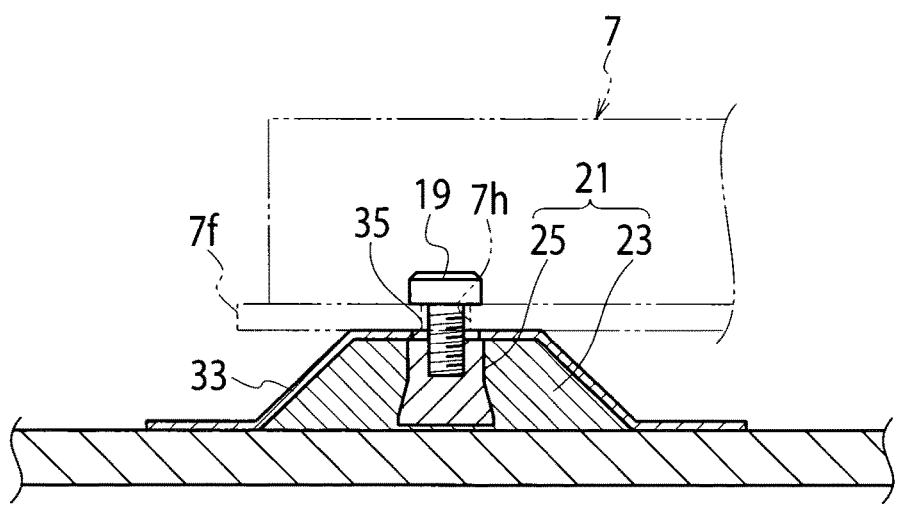
FIG. 1B is an elevational sectional view of the attachment boss and the part of the fan case.

Referring to FIG. 1A and FIG. 1B, each attachment boss 21 is in general composed of a pedestal 23 and an embedded body 25 embedded therein. The pedestal 23 has a bottom face with a shape corresponding to the outer periphery of the fan case, thereby being capable of tightly fitting on the fan case 1. Normally by means of adhesive such as epoxy-resin or such, the pedestal 23 and the fan case 1 are combined together. If possible, any other method of combining is applicable. The embedded body 25 has a combining structure combinable with the auxiliary device 7, thereby combining with the auxiliary device 7.

Figure 2A:
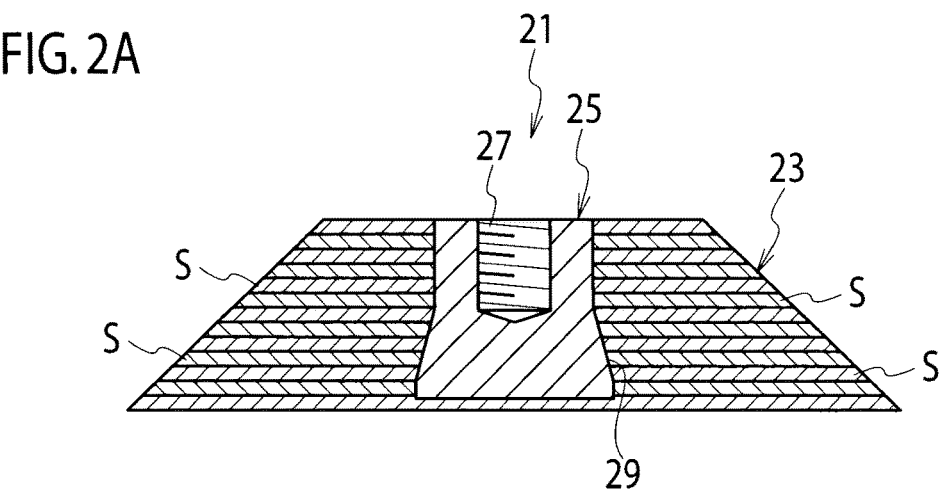
FIG. 2A is an elevational sectional view of the attachment boss.

Referring to FIG. 2A, the pedestal 23 is in general comprised of a plurality of accumulated layers of reinforcement fibers S and a matrix combining the reinforcement fibers S together. The reinforcement fibers S are for example carbon fibers. Alternatively, instead of, or in addition to, the carbon fibers, applicable are fibers of any one or more of glass, aramid including Kevlar, dyneema and such The plurality of layers are preferably layered in parallel with the outer periphery of the fan case 1 in light of efficacy in standing against force in parallel with the outer periphery of the fan case 1, but may be oriented in any other direction. In addition, in light to efficacy in reducing anisotropy of strength, the fibers in the respective layers are preferably oriented not in parallel with each other, but may be parallel. The matrix is typically of a thermosetting resin but, if possible, may be of any other material. As the thermosetting resin, the epoxy resin, the phenol resin and the polyimide resin can be exemplified.

A column, a prism or any of various shapes is applicable to the pedestal 23. In light of efficacy in increasing adhesion area on the fan case 1, its shape is preferably a shape widening toward its bottom and thus a truncated cone and a truncated pyramid can be exemplified for instance. Alternatively, its top portion may be any proper shape of a column, a prism, a truncated cone, a truncated pyramid or such and any proper shape of a wider column, a wider prism, a wider truncated cone, a wider truncated pyramid or such may be combined with its bottom.

Figure 2B:
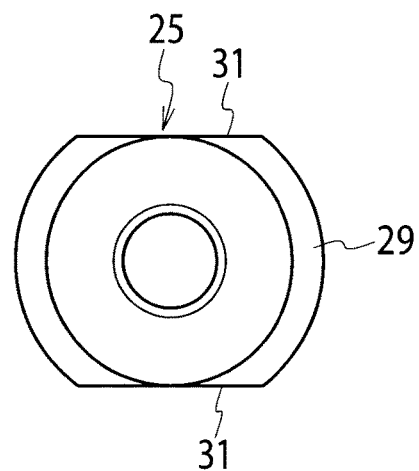
FIG. 2B is a plan view of an embedded body for the attachment boss.
Figure 2C:
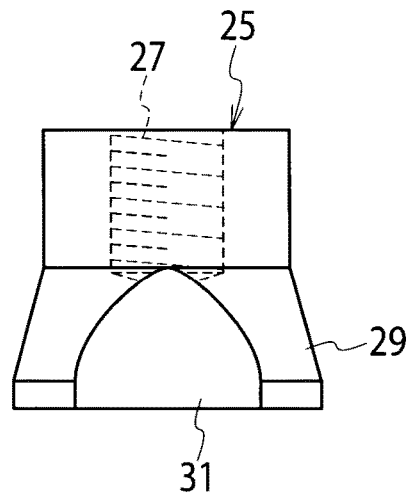
FIG. 2C is an elevational view of the embedded body.

Referring to FIG. 2B and FIG. 2C, the embedded body 25 is for instance made of a metal such as a stainless steel. Alternatively a resin such as polycarbonate or any proper ceramic may be applied thereto. The embedded body 25 has a proper combining structure combinable with the auxiliary device 7 and its example shown in the drawings is a threaded bore 27 in which a bolt can be tightened. As illustrated in FIG. 1B, by means of a bolt 19 inserted in a bolt hole 7h that a flange 7f of the auxiliary device 7 has, the boss 21 and the auxiliary device 7 are combined together. Alternatively a projection for combining with a hook or such or any other proper structure may be applied thereto.

The embedded body 25 is comprised of an anti-displacement portion 29 so configured as to prevent itself from being displaced off from the pedestal 23. In the example shown in the drawings, its lower part radially projects from its neck portion. Further in the example shown in the drawings, while the embedded body 25 broadens in diameter toward the lowermost end, it may bulge in the middle as with a barrel. Further, instead of the shape gradually broadening in diameter, a structure sharply projecting like a flange may be applied thereto. In the pedestal 23, a part in contact with the neck portion is necessarily smaller in diameter than a portion broadening in diameter in the embedded body 25 so as to catch the portion, thereby preventing the embedded body 25 from being displaced off.

The embedded body 25 is further comprised of anti-rotation portions 31 so configured as to prevent rotation relative to the pedestal 23. In the example shown in the drawings, the anti-displacement portion 29 is partly cut out and is therefore circumferentially uneven in diameter. Instead of the cutouts, the totality thereof may be formed in a pyramid, star, or gear shape. Alternatively uneven-in-diameter parts may be provided at parts but the anti-displacement portion 29. The anti-rotation portions 31 that are circumferentially uneven in diameter are limited to the bottom and its neighbor but may be formed at any part. When force is applied in a direction that forces the embedded body to rotate, the anti-rotation portions 31 that are circumferentially uneven in diameter stand against the force to prevent the embedded body 25 from rotating.

The pedestal 23 and the embedded body 25 may be bonded together by means of any proper adhesion. Alternatively they may be fixed only by means of mutual fitting. In any case, preferably, they are made to get in close contact with no gap.

Referring back to FIG. 1A and FIG. 1B, to cover a part of the outer periphery of the fan case 1 and the pedestal 23 preferably, a cover 33 is adhered to them. The cover 33 is preferably of FRP as with the pedestal 23 but any other material may be applied thereto. The cover 33 has an opening 35 for the purpose of access to the combining structure of the embedded body 25. Around the opening 35, the cover 33 covers the embedded body 25 as well but the totality of the top of the embedded body 25 may be exposed.

Rims of the adhesion interface between the bottom of the pedestal 23 and the outer periphery of the fan case 1 tend to be starting points of delamination. The cover 33 necessarily covers these portions and stands against tensile force applied thereto, so as to be resistive to delamination. The cover 33 is as well used to regulate height of the attachment boss 21.

As the attachment boss 21, at least the most part thereof, is formed of any light-weight material such as FRP and does not require the fan case to be bored, it enables secure fixation of the auxiliary device without impairing advantages of the fan case of FRP. Further, as being adhered to the fan case with sufficiently wide adhesion area provided by its bottom face, the attachment boss 21 exerts strong resistance to phenomena in that the auxiliary device fall off or displaces. Still further, the attachment boss 21 presents wide options about locations where the attachment boss 21 is attached and, as the attachment boss 21 can be attached to the fan case even after production, it enables users to attach auxiliary devices to arbitrary sites at any time.

Although the invention has been described above by reference to certain embodiments of the invention, the invention is not limited to the embodiments described above. Modifications and variations of the embodiments described above will occur to those skilled in the art, in light of the above teachings.

INDUSTRIAL APPLICABILITY

A boss for attachment, which enables secure fixation of an auxiliary device by a readily applicable method such as tightening by a bolt is provided.

What is claimed is:

1. A boss for attachment of an auxiliary device to a fan case of an engine, comprising:
a pedestal including a plurality of accumulated layers of reinforcement fibers and a matrix combining the reinforcement fibers together, the pedestal comprising a bottom face in a shape capable of being in close contact with an outer periphery of the fan case;
an embedded body embedded in the pedestal and including a combining structure combinable with the auxiliary device;
a cover covering and adhering to a part of the outer periphery of the fan case and the pedestal; and
an adhesive joining the outer periphery of the fan case, the pedestal, and the cover together,
wherein the cover covers rims of an adhesion interface between the bottom face of the pedestal and the outer periphery of the fan case.

2. The boss of claim 1, wherein the combining structure includes one selected from the group consisting of a threaded bore allowing a bolt to be tightened in the threaded bore, an engaging hole engageable with the auxiliary device, and a projection engageable with the auxiliary device.

3. The boss of claim 1, wherein the embedded body comprises a neck portion and an anti-displacement portion projecting radially from the neck portion.

4. The boss of claim 1, wherein the embedded body comprises an anti-rotation portion having circumferentially uneven diameters.

5. The boss of claim 1, wherein the embedded body is of a metal.

6. The boss of claim 1, wherein the pedestal forms a shape broadening toward the bottom face.

7. The boss of claim 1, wherein the plurality of layers are accumulated in parallel with the outer periphery of the fan case.

8. A fan case of an engine, to which an auxiliary device is attached, comprising:
 a case main body of a fiber reinforced composite material;
 a boss joined to an outer periphery of the case main body;
 a pedestal including a plurality of accumulated layers of reinforcement fibers and a matrix combining the reinforcement fibers together, the pedestal comprising a bottom face in a shape capable of being in close contact with an outer periphery of the fan case;
 an embedded body embedded in the pedestal and including a combining structure combinable with the auxiliary device;
 a cover covering and adhering to a part of the outer periphery of the fan case and the pedestal; and
 an adhesive joining the outer periphery of the fan case, the pedestal, and the cover together,
 wherein the cover covers rims of an adhesion interface between the bottom face of the pedestal and the outer periphery of the fan case.

9. The fan case of claim 8, wherein the combining structure includes one selected from the group consisting of a threaded bore allowing a bolt to be tightened in the threaded bore, an engaging hole engageable with the auxiliary device, and a projection engageable with the auxiliary device.

10. The fan case of claim 8, wherein the embedded body comprises a neck portion and an anti-displacement portion projecting radially from the neck portion.

11. The fan case of claim 8, wherein the embedded body comprises an anti-rotation portion having circumferentially uneven diameters.

12. The fan case of claim 8, wherein the embedded body is of a metal.

13. The fan case of claim 8, wherein the pedestal forms a shape broadening toward the bottom face.

14. The fan case of claim 8, wherein the plurality of layers are accumulated in parallel with the outer periphery of the fan case.

* * * * *